May 12, 1970  A. TANAKA  3,511,109
ADJUSTABLE CONTROL PEDALS
Filed Oct. 14, 1968  2 Sheets-Sheet 1

INVENTOR.
Akira Tanaka
BY
D. L. Ellis
ATTORNEY

INVENTOR.
Akira Tanaka
BY
D. L. Ellis
ATTORNEY

United States Patent Office 3,511,109
Patented May 12, 1970

3,511,109
ADJUSTABLE CONTROL PEDALS
Akira Tanaka, Northridge, Calif., assignor to General Motors Corporation, Detroit, Mich., a corporation of Delaware
Filed Oct. 14, 1968, Ser. No. 767,138
Int. Cl. G05g 5/12
U.S. Cl. 74—560          3 Claims

ABSTRACT OF THE DISCLOSURE

An arrangement of control pedals for the clutch, service brake and throttle mechanisms of an automotive vehicle in which the several pedal members are adjustable as a unit fore and aft relative to the operator's seat in a linear path to various relationships with respect to nonadjustable control members connected to the control mechanisms. The adjusting mechanism includes a first toothed pinion gear mounted rotatably on each pedal member and meshed with a toothed rack on the body and further with a second pinion member meshed with a toothed rack on the respective control member whereby selected rotation of a common shaft carrying the various body engaged pinions causes fore and aft movement of the pinions with the pedal members over the stationary racks to a selected position within the vehicle. Control forces applied to any of the pedal members when the shaft is held stationary pivots the pedal member about the shaft to oscillate the second pinion about the first and shift the control member to actuate the mechanism.

---

This invention relates to control pedal arrangements for automotive vehicle bodies and more particularly to an improved adjustable control pedal arrangement for vehicle bodies.

One feature of this invention is that it provides an improved automotive vehicle control pedal arrangement wherein the several pedals may be adjusted to a plurality of selected positions with respect to the operator's seat. Another feature of this invention is in the provision of positional adjustment of the several pedals in unison along a rectilinear path to a number of selected positions therein relative to nonadjustable control member for the various control mechanisms of the vehicle and in which each of the several pedals act as a suspended or second-class lever type of pedal under foot pressure applied thereon to shift its respective control member to a position actuating the respective mechanism. A further feature of the invention is in the provision of precisely controllable adjusting mechanism for the pedals including toothed or like pinion gear members rotatably mounted on each of the several pedal members and engageable with rack members affixed to the body and to the respective control members whereby selected rotation of a common shaft carrying a pinion gear of each pedal member will cause rectilinear shifting movement of the pinions and the pedal members over the racks to a desired position with the respect to the control members and the operator's seat.

These and other features of the invention will be readily apparent from the following specification and from the drawings wherein.

Figure 1:
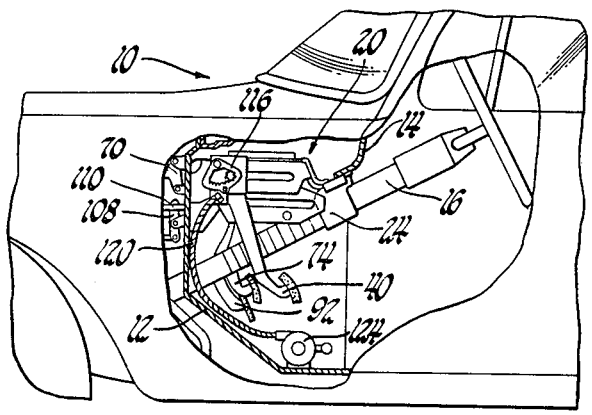
FIG. 1 is a fragmentary partially broken away elevational view of an automotive vehicle body control pedal arrangement according to this invention.

Referring now particularly to FIG. 1 of the drawings, there is shown a vehicle body 10 including a firewall 12 separating the forward engine compartment of the vehicle from the passenger compartment, and instrument panel structure indicated at 14 rearward of the firewall and mounting a steering column 16 extending through the firewall to within the engine compartment. An adjustable control pedal arrangement according to this invention for the vehicle driveline clutch, service brake and throttle mechanisms is mounted on the firewall 12 and further to the instrument panel 14.

Referring first to the pedal unit for the driveline clutch ment includes support bracket structure 20 including a pair of laterally outermost flanges 22 extending rearwardly from riveted or like securement at the firewall to connect with the instrument panel 14 and a steering column support sleeve 24. Intermediate flanges 28 of the bracket structure include lateral extensions fixed to the firewall and flanges 28 also extend rearwardly for joining with the instrument panel 14. The flanges 22 are provided with guideway apertures at 30 and 32 to receive a pedal support shaft 34 extending the full width of the support bracket structure, the shaft being rotatably mounted in a slidable bearing 36 in the guideway 32 of the right-hand flange 22 and in a slidable bearing block 38 received in the guideway 30 of the lefthand flange 22.

Referring first to the pedal unit for the driveline clutch of the vehicle, the same includes a pedal member 40 carrying at its lower end a foot pad 42 and formed at its upper end with a bifurcated portion 44 each leg of which is apertured to receive under bushings therein the axially extended hub 48 of a toothed pinion gear 46 pinned or otherwise nonrotatably mounted to the shaft 34. Pinion 46 meshes at one side thereof with a toothed rack 50 which is secured over a slot in an upper lateral web portion of the support bracket structure 20. The clutch pedal unit further includes a shiftable control member 52 of elongated configuration received between the legs of bifurcated portion 44 of the clutch pedal and having an elongated slot 54 receiving a pin 56 secured between such legs of the pedal member and rotatably mounting therebetween a second pinion gear 58 meshingly engaged with the pinion 46. Pinion 58 further meshes at the opposite side thereof with a rack 60 located internally of the control member 52 below the slot 54 and generally coextensive therewith. At its forward end, the control member 52 has pinned connection at 62 with the free end of an actuating lever 64 pivotally mounted at 66 on support bracket structure 20. Lever 64 further connects with a link 68 pinned to a bellcrank 70 on firewall 12 which in turn connects with the actuating rod and bellcrank linkage 72 extending to the vehicle driveline clutch mechanism, not shown.

The brake pedal unit is similar in all respects to that just described for the clutch and includes a similarly bifurcated brake pedal 74 pivotally mounted at its upper end on the hub of a first pinion gear 76 pinned on the shaft 34 and carrying at its lower end a foot pad 78. The pinion 76 meshes with a rack 80 on support structure 20 and further with a second pinion 82 rotatably mounted by a pin 84 between the bifurcated legs of the brake pedal. The second pinion 82 further meshes with an internal rack 86 in an elongated shiftable control member 88 identical to the control member 52. Control member 88 is connected with a pivoted actuating lever, not shown in detail, on the bracket structure and which is further connected with a brake push rod 90 extending to the master brake cylinder or power brake mechanism of the vehicle.

The pedal unit for the accelerator or throttle control is again identical to the brake and clutch units and includes a bifurcated pedal member 92 pivotally received over the hub of a first pinion 94 fixed to the support shaft 34 and carrying at its lower end a pivoted foot pad 96 biased by a torsion spring clockwise to the generally vertical attitude shown. Meshingly engaged with the pinion 94 is a further pinion 98 mounted rotatably within the bifurcated pedal 92 by a pin 100 between the legs thereof and which is further meshed with a rack 102 of a control member 104 similar to those of the brake and clutch units. The control member 104 is connected with a link 106 extending through the firewall to a lever 108 connected at its other end with the throttle control rod 110.

Figure 4:
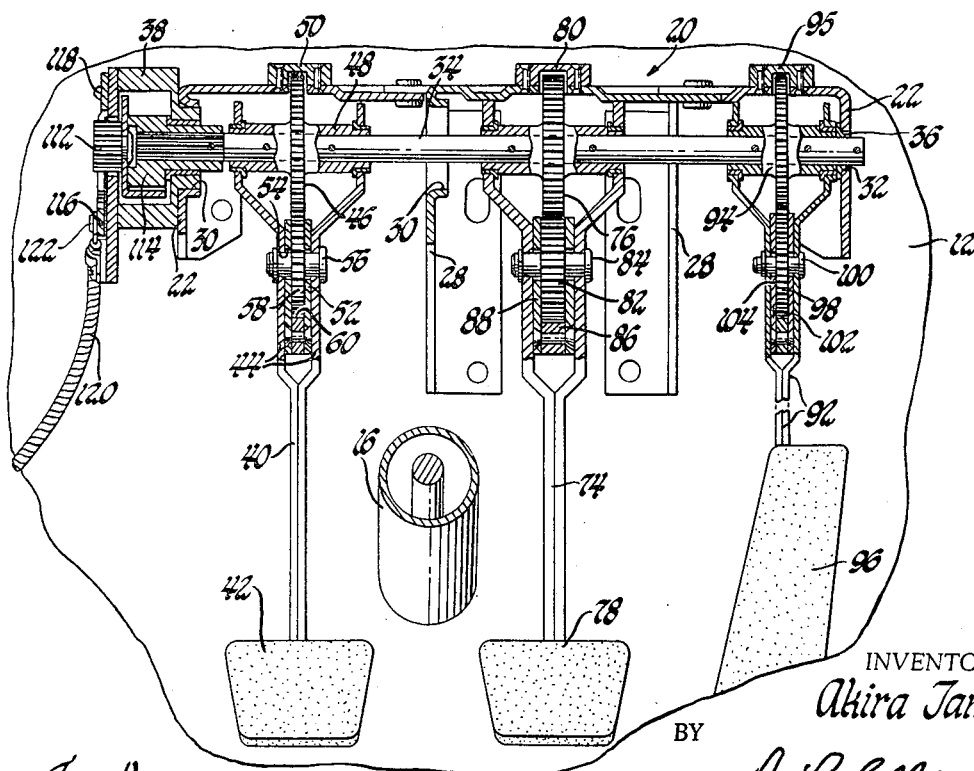
FIG. 4 is a sectional view taken generally along the planes indicated by the lines 4—4 of FIG. 2.

Apparatus for selective positional adjustment of the several pedals within the passenger compartment of body 10 includes a gear 112 suitably fixed to an end portion 114 of support shaft 34 within the bearing block 38, FIG. 4, the gear being meshed with an internally toothed segmental gear 116 pivoted at 118 on the exterior of the bearing block. The core of a flexible push-pull cable assembly 120 is pinned to such segmental gear 116 at 122 and the cable extends adjacent the vehicle firewall and toepan to a manual actuating drum 124 mounted on the vehicle floor pan at a location convenient to manipulation of the hand lever thereof from the vehicle operator's seat, not shown.

In the normal condition of each of the several control pedals in a selected or adjusted position thereof with respect to the passenger seat, the same are each pivotable about the axis of support shaft 34 between the normal unactuated or rest position thereof, which is dictated by the usual rearward bias through the several control linkages 72, etc., to an actuated position depressed toward the firewall 12. Such pedal travel is exemplified in the drawings by the clutch pedal 40 shown in the nonactuated position in solid lines in FIG. 2, and the actuated position thereof, FIG. 3. Foot pressure applied to the foot pad 42 causes the pedal to pivot forwardly toward the firewall about its journal on the hub 48 of the pinion 46 and in so doing carry the pin 56 over a circular arc about shaft 34 in a direction forwardly toward the firewall to thereby cause the teeth of the pinion 58 to advance over the teeth of the pinion 46 and thereby cause a similar advance of rack 60 of control member 52 bodily along with pin 56. Thus, the control member is displaced or shifted in a generally linear path from the nonactuated position shown in FIG. 2 to the actuating position shown in FIG. 3, thereby to actuate the clutch control linkage 72 and the clutch mechanism. Slight rocking of the control member in a vertical plane does occur during its shifting movement due to the arcuate path of travel of pin 62 therewith. Release of foot pressure from pad 42 allows the return bias in the clutch mechanism or linkage to restore the control member 52 rearwardly to nonactuated position and thereby carry the pinion 58 and pin 56 rearwardly in an arc over the teeth of pinion 46 and in turn swing the pedal 40 back to nonactuated position. It is believed apparent that actuating foot pressure applied to either of the brake or throttle control pedals 74 or 92 swinging it to actuated position results in similar operation of the brake push rod 90 and the throttle control rod 110 through the control members 88 or 104.

Figure 2:
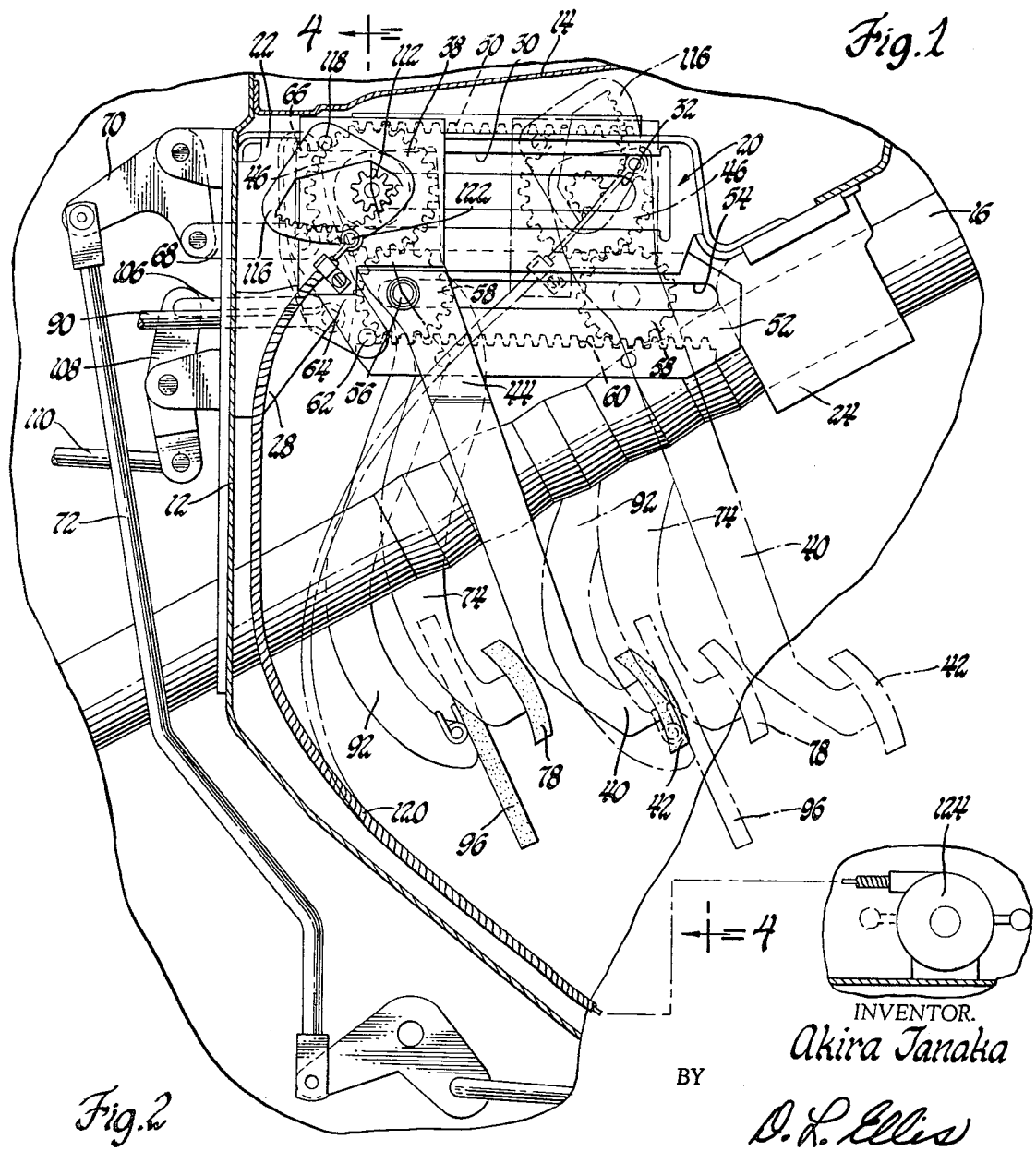
FIG. 2 is an enlarged portion of FIG. 1 indicating the range of positional adjustment of the control pedals in a most forward and most rearward position shown in solid and broken lines respectively.
Figure 3:
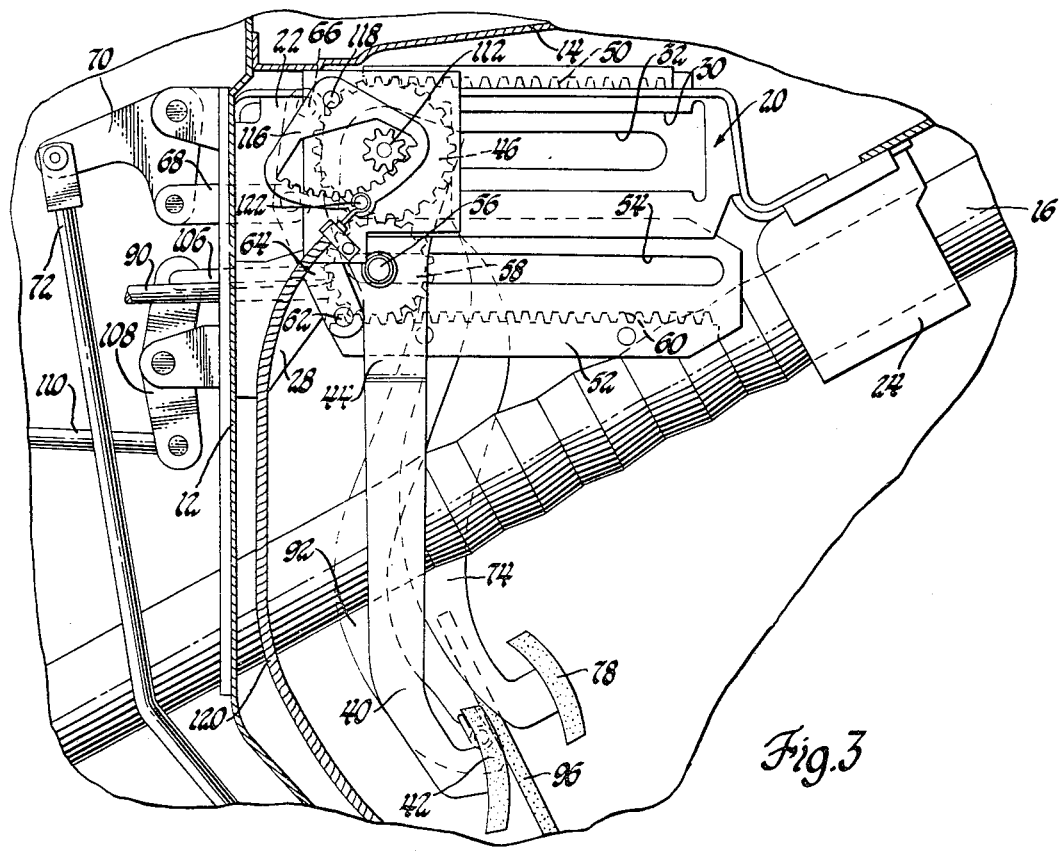
FIG. 3 is a view similar to FIG. 2 in the forwardmost position of the pedals and showing the clutch pedal depressed to an actuated condition.

For positional adjustment of the several pedal members 40, 74 and 92, as for example from the forwardmost to the rearwardmost positions indicated in solid and broken lines in FIG. 2, the lever of the cable control drum 124 is manipulated to extend the core of the cable 20 in a direction rotating the segmental gear 116 counterclockwise about its pivot 118 from the position shown for counterclockwise rotation of the gear 112 and the support shaft 34. Such rotation on the shaft rotates each of the pinions 46, 76 and 94 counterclockwise in mesh with the stationary racks 50, 80 and 95 so that these pinions and the support shaft 34 are caused to translate rearwardly as a unit thereover to carry the journaled ends of the pedals in the same direction. As the pinions 46, 76 and 94 rotate, they cause conjoint rotation of the pinions 58, 82 and 98 in a clockwise direction in mesh with the racks 60, 86 and 102 of the several control members. With the control members being held again forward movement from rest position by the return bias in the respective vehicle mechanism, and against rearward movement by limit stops in the lever 64, etc., such rotation of these latter pinions of course results in a rearward translation of the pins 56, 84 and 100 at the same rate of travel as the control shaft so that the pedal members are bodily shifted rearwardly in a rectilinear path relative to both the support bracket 20 and the control members 52, 88 and 104. The length of adjustable travel of the pedals is of course limited by the guideway apertures 30 and 32 in the support bracket flanges, and it will be noted that the arc of segmental gear 116 is determined according to this aperture length. In the newly selected rearwardmost position of the pedals indicated in the broken lines of FIG. 2, it is seen that the pedals are maintained in the generally vertical attitude or angular relationship to the vehicle passenger seat as obtains in all positions of the pedals by virtue of the conjoint translation of the axes through the pedals at support shaft 34 and through the various connecting pins between the pedals and the respective control members. Actuating travel in any of the pedals is constant in nature and amount in any adjusted position of the pedal units and accordingly, there is no change of mechanical advantage in the pedal units during positional adjustment of the pedals. A reverse adjustment of the pedal units from the rearwardmost to the forwardmost position is believed apparent from the foregoing, the hand lever on the control drum 124 of course being manipulated in the reverse direction to rotate the segmental gear 116 clockwise for similar clockwise rotation of support shaft 24 and consequent conjoint rotation of the several meshed pinions on the shaft and the pedal members to shift the pinions and pedals forwardly over the several racks on the support bracket and control members. It is of course evident that any position of the pedals intermediate these forwardmost and rearwardmost positions may also be selected with the control drum 124. Suitable provisions for irreversibility in this drum taken with irreversibility in the connection of gears 112 and 118 will of course serve to hold shaft 34 and the pedals against unwanted shifting from the selected position thereof.

Having thus described the invention, what is claimed is:

1. In a vehicle body including a mechanism to be operated, adjustable control pedal apparatus comprising: a control member movably mounted on the body and connected to said mechanism; a pedal member; means supporting said pedal member on the body for bodily generally rectilinear movement relative thereto and relative to said control member to a plurality of adjusted positions within the body and for pivotal actuating movement about an axis of said pedal member; and pedal adjustment means including pinion means mounted on said pedal member for rotation on said axis and drivingly engaged with rack means on said control member, and means for causing selected rotation of said pinion means on said axis to move said pedal member bodily generally rectilinearly along said rack means relative to the body and to said control member to a selected adjusted position thereof within the body, forces applied to said pedal member while holding said pinion means against rotation on said axis causing pivoting movement of said pedal member about said axis and movement of said control member relative to the body to actuate the mechanism.

2. In a vehicle body including a mechanism to be operated, adjustable control pedal apparatus comprising: a control member movably mounted on the body and connected to said mechanism, a pedal member supported on the body for bodily generally rectilinear movement relative thereto and relative to said control member to a plurality of adjusted positions within the body and for pivotal actuating movement about an axis located intermediate the ends of said pedal member, a pair of rotation transmitting wheels mounted on said pedal member and drivingly engaged for conjoint rotation respectively on said intermediate axis of said pedal member and an axis spaced therefrom, first rack means on the body engaged as a pinion by one of said wheels, second rack means on said control member engaged as a pinion by the other of said wheels, and adjustment operating means operatively connected to said one wheel for selected rotation thereof over said first rack means, selected rotation of said one wheel and conjoint rotation of said other wheel therewith moving said pedal member bodily generally rectilinearly relative to the body and to said control member to a selected adjusted position thereof within the body, forces applied to said pedal member while holding said one wheel against rotation on its respective axis causing pivoting movement of said pedal member about said intermediate axis of said pedal member and movement of said control member relative to the body to actuate the mechanism.

3. In a vehicle body including a plurality of control mechanisms to be operated such as service brake, clutch and throttle mechanisms, adjustable control pedal apparatus comprising: a control member for each of the mechanisms connected thereto and mounted movably on the body; a control pedal assembly for each of said mechanisms, said assembly including a pedal member adapted for generally rectilinear movement relative to the body and to the respective control member to a plurality of adjusted positions within the body and for pivotal actuating movement about an axis located intermediate the ends of said pedal member, a first toothed pinion gear rotatably mounted on said pedal member on said axis of the latter, first rack means on the body engaged by said first pinion gear, a second pinion gear rotatably mounted on said pedal member on an axis spaced from the first named axis of said pedal member drivingly engaged with said first pinion gear for conjoint rotation therewith, second rack means on said respective control member engaged by said second pinion gear; shaft means mounted for rotation and bodily shifting movement on said body and extending between said pedal assemblies for rotation on the first named axis of each said pedal member and supporting each said pedal member on the body, said shaft means being connected with each said first pinion gear for conjoint rotation therewith; and adjustment operating means for selectively rotating said shaft means and conjointly rotating said first and second pinion gears of each said pedal assembly to move each said pedal member bodily generally rectilinearly on said first and second rack means relative to the body and to said control member to a selected adjusted position within the body, forces applied to any of said pedal members while holding said shaft means against rotation causing pivoting movement of such pedal member about the first named axis thereof and movement of its respective control member relative to the body to actuate the respective mechanism.

References Cited

UNITED STATES PATENTS

| | | | |
|---|---|---|---|
| 3,242,763 | 3/1966 | Buchwald | 74—560 |
| 3,282,125 | 11/1966 | Dully | 74—512 XR |

FRED C. MATTERN, Jr., Primary Examiner

F. D. SHOEMAKER, Assistant Examiner